Patented Mar. 16, 1943

2,314,188

UNITED STATES PATENT OFFICE 2,314,188

METHOD OF TREATING CALCIUM SILICATE

Raymond P. Allen, Akron, Ohio, assignor to The B. F. Goodrich Company, New York, N. Y., a corporation of New York No Drawing. Application August 29, 1940, Serial No. 354,728

5 Claims. (Cl. 106—306)

This invention relates to a method of treating calcium silicate prior to its incorporation as a reinforcing pigment in rubber.

Finely divided calcium silicate has found application in many varied industries such as the rubber industry where the material is used in compounded rubber as a reinforcing pigment thereby giving increased tensile strength and resistance to tear to the rubber. Rubber compounded with calcium silicate is admirably suited for making tire inner tubes and carcasses, heels, soles, and the like. Difficulties have been encountered in the use of calcium silicate as a reinforcing pigment for rubber, however, because ordinary calcium silicate, in the presence of accelerators, has a marked effect upon the rate of vulcanization of rubber and sometimes even completely prevents vulcanization. For instance when alkaline vulcanization accelerators such as diphenyl guanidine and diorthotolyl guanidine are used with calcium silicate in the compounded rubber the normal rate of vulcanization is increased materially. On the other hand, when acid accelerators, such as mercapto benzothiazole, are used the rate of vulcanization is retarded to such a degree that vulcanization is practically stopped completely. It is therefore the object of this invention to provide a method whereby calcium silicate is treated in such a manner that its use as a reinforcing pigment in the compounding of rubber will give the vulcanized rubber all the advantages which are inherent in the pigment but without the disadvantages that are exemplified in its abnormal effect on the rate of vulcanization of the compounded rubber.

I have discovered that finely divided calcium silicate can be treated with any of a number of chemical compounds, preferably in solution, and that after such treatment the calcium silicate may be compounded with rubber with no apparent effect on the rate of vulcanization, irrespective of whether an acid or an alkaline vulcanization accelerator is used. Examples of chemicals that produce this improvement are carbon dioxide, carbonic acid, ammonium carbonate, ammonium fluoride, sodium fluoride, potassium fluoride, potassium chromium sulfate, aluminum sulfate, sodium phosphate, chromium sulfate, oxalic acid, phosphoric acid, ammonium stearate, and ammonium oleate. These materials are all compounds which in water solution liberate ions that insolubilize calcium ions. It appears that the effect of untreated calcium silicate upon the rate of vulcanization of rubber might be due to the presence of water-soluble calcium compounds, particularly calcium oxide. The treating compounds, examples of which are listed above, are water-soluble and react with calcium ions to form insoluble compounds and these insoluble compounds so formed are non-hydrolyzing.

Although any of the above treating materials will prove effective in counteracting the adverse effect of calcium silicate on the rate of vulcanization of rubber, the use of carbon dioxide, carbonic acid or a water-soluble carbonate such as ammonium carbonate is preferred. These have the advantage of being cheap, highly efficient and simple to use. In a preferred embodiment of the invention, the treatment essentially comprises either bubbling carbon dioxide through an aqueous slurry of the calcium silicate or, in those cases where the treating compounds are solids, of mixing the calcium silicate with a solution of the treating compound, allowing the mixture to stand, and then drawing off the solution and washing the solid calcium silicate with water.

It is to be understood that there are many chemical compounds other than those specifically mentioned herein that have the property of insolubilizing the soluble calcium compounds found with calcium silicate so that these new insoluble compounds will be non-hydrolyzing and so that these chemical compounds will counteract the effect that ordinary calcium silicate normally has on accelerators of rubber vulcanization. Any of these chemical compounds may be employed in the invention without departing from the spirit and scope of the invention as defined in the appended claims.

I claim:

1. The method of treating calcium silicate prior to its incorporation as a reinforcing pigment in rubber which comprises treating the calcium silicate with a compound having the property of insolubilizing the soluble calcium compounds present in the calcium silicate.

2. The method of treating calcium silicate prior to its incorporation as a reinforcing pigment in rubber which comprises treating the calcium silicate with an aqueous solution of a chemical compound which in water solution liberates ions that insolubilize calcium ions.

3. The method of treating calcium silicate prior to its incorporation as a reinforcing pigment in rubber which comprises treating the calcium silicate with a solution containing a carbonate ion in order to insolubilize the soluble calcium compounds present in the calcium silicate.

4. The method of treating calcium silicate prior to its incorporation as a reinforcing pigment in rubber which comprises treating the calcium silicate with an aqueous solution of a carbonate in order to insolubilize the soluble calcium compounds present in the calcium silicate.

5. The method of treating calcium silicate prior to its incorporation as a reinforcing pigment in rubber which comprises treating the calcium silicate in an aqueous medium with carbon dioxide in order to insolubilize the soluble calcium compounds present in the calcium silicate.

RAYMOND P. ALLEN.